United States Patent
Levy et al.

(10) Patent No.: US 6,363,069 B1
(45) Date of Patent: Mar. 26, 2002

(54) COMPLETE PACKET DISCARDING

(75) Inventors: Yonatan Aharon Levy; Xiaowen Mang, both of Manalapan, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/108,136

(22) Filed: Jun. 30, 1998

(51) Int. Cl.[7] .............................................. G06F 13/00
(52) U.S. Cl. ...................... 370/389; 370/231; 370/235; 709/235
(58) Field of Search .................................. 370/229, 230, 370/231, 232, 235, 236, 395.1, 395.2, 395.21, 395.41, 395.42, 395.43, 412; 709/227, 228, 229, 235

(56) References Cited

U.S. PATENT DOCUMENTS

| | | | | | |
|---|---|---|---|---|---|
| 4,769,810 | A | * | 9/1988 | Eckberg, Jr. et al. | 370/231 |
| 5,233,606 | A | * | 8/1993 | Pashan et al. | 370/412 |
| 5,282,203 | A | * | 1/1994 | Oouchi | 370/231 |
| 5,650,993 | A | * | 7/1997 | Lakshman et al. | 370/236 |
| 5,729,530 | A | * | 3/1998 | Kawaguchi et al. | 370/236 |
| 5,764,641 | A | * | 6/1998 | Lin | 370/412 |
| 6,092,115 | A | * | 7/2000 | Choudhury et al. | 709/235 |
| 6,246,687 | B1 | * | 6/2001 | Siu | 370/412 |

OTHER PUBLICATIONS

Kara et al. ("Toward a Framework for Performance Evaluation of TCP Behaviour over ATM Networks", ICCC'97, pp. 1–12.*

Lakshman et al. ("The Drop from Front Strategy in TCP and in TCP over ATM", IEEE, pp. 1242–1250, 1996).*

Hassan et al. ("Impact of Cell Loss on the Efficiency of TCP/IP over ATM", GLOBECOM'94, pp. 1–11, Feb. 9, 1994).*

Statistical Analysis and Simulation Study of Video Teleconference Traffic in ATM Networks, Daniel Hayman, et al, IEEE Transactions on Circuits and Systems for Video Technology, vol. 2, No. 1, Mar. 1992.

A Measurement–Based Loss Scheduling Scheme, Tao Tang et al, Proceedings INFOCOM '96, pp. 1062–1071, 1996.

Performance Evaluation of Seletive Cell Discard Schemes in ATM Networks, Kenji Kawahara et al, Proceedings INFOCOM'96, pp. 1054–1061, 1996.

* cited by examiner

*Primary Examiner*—Wellington Chin
*Assistant Examiner*—Frank Duong
(74) *Attorney, Agent, or Firm*—Brendzel

(57) ABSTRACT

In a node that receives cells for many connections, a method discards entire packets when the node's buffer is full. The selected connection is one that includes at least one cell that corresponds to the beginning of a packet. In another embodiment, the connection is chosen by first making an initial selection, determining whether that selection can stand, and if not, by making an alternate selection. When an alternate selection is made, a credit factor associated with the initial selection is decremented, while the credit factor of the alternate selection is incremented. The initial selection can be carried out by considering the overall traffic load at the node, the individual traffic loads that comprise the overall traffic load of the node, and the QoS that is desired for the various connections that are active in the node.

18 Claims, 3 Drawing Sheets

COMPLETE PACKET DISCARDING

RELATED APPLICATION

This application is related to another application, titled "Quality of Service-Oriented Cell Discarding", having the Ser. No. 09/108,137, filed concurrently with this application, for the same inventors, and assigned to the assignee of this application.

BACKGROUND

This invention relates to ATM networks and, more particularly, to approaches for transmitting cells through ATM network nodes that, at times, are unable to accommodate incoming data.

ATM networks transmit cells from a source point in the network to a destination point in the network by passing the cells from node to node through connecting links. Each node comprises a number of input ports and output ports. Here we consider an ATM switch with output port buffering. Connections from different input ports can be routed to the same output port. Each output port will function as a multiplexer. An incoming cell is routed to a particular one of the output ports in accordance with a path that is established for a virtual circuit to which the cell belongs. Each cell has a header portion and a data portion. In addition to the virtual connection's ID, the header portion includes information about control information about the data that it is carrying. The data carried by the cells may have its own, higher level, structure, such as "packets" that are made up of a number of cells.

It is possible that the packets which need to be transmitted on a particular output port are too numerous to be accommodated by the bandwidth available at a link connected to that particular output port. To prevent the loss problem that, obviously, might occur, a buffer is provided. Still, it is possible for the buffer to overflow, causing a loss of cells. Obviously, if a cell loss must be suffered, it is better to lose cells in accordance with a thought-out algorithm, than to lose cells indiscriminately.

To date, most efforts pertaining to cell loss in an ATM node have been concentrated on methods for increasing ATM network efficiency by maximizing statistical gain while still guaranteeing the aggregated Quality of Service (QoS) of connections. Most of the work is based on the use of a single First-In-First-Out (FIFO) buffer for all connections. The problem with a simple FIFO buffer approach is that there is no way to distinguish one connection from another without adding some costly enhancements. It has been shown, however, that in a single FIFO queuing system where no accounting is taken of connections, if arriving cells are dropped in case of buffer overflow, for a given set of connections the burstier connections experience a higher Cell Loss Ratio (CLR) and may actually fail to maintain the desired QoS levels, even though the QoS of that aggregate traffic is still satisfied.

In contrast to single FIFO queuing architecture, "per-virtual connection" queuing provides a more flexible and effective architecture for enhancing traffic management at ATM nodes. With such an architecture, one can attempt to fairly distribute shared buffer resources across active connections so as to provide QoS assurance on individual connection basis.

All currently known schemes for buffer sharing require some pre-calculated thresholds that require prior knowledge of traffic characteristics and of the service discipline to be used but which are very difficult to determine and not practical to implement. In "Dynamic Queue Length Thresholds in a Shared Memory," by A. Choudhury and E. Hahne, Proc. INFOCOM'96, pages 679–687, 1996, for example, a dynamic queue length thresholds scheme is proposed to selectively discard packets where the maximum permissible length of any individual queue at any instant is a function of the unused buffer capacity. Compared with static threshold schemes, this scheme automatically adapts the load variation among the output queues. However, the assurance of cell loss requirements for individual connections is not addressed in this scheme.

A Weighted Fair Blocking (WFB) mechanism for discrete-time multiplexing is proposed in "Weighted Fair Blocking Mechanism for Discrete-Time Multiplexing," by A. Conway and C. Rosenberg, Proc. INFOCOM'96, pages 1045–1053, 1995. In WFB, packets arrive in batches and the algorithm rejects some of the packets in a batch arrival when there is insufficient space in the buffer, or buffers. Although it is claimed that WFB decouples buffer dimensioning from parameterization of the discard algorithm, the process of determining appropriate weights so as to satisfy different loss requirements remains as difficult as determining appropriate threshold values in any threshold based control policies. The fact that, when implementing the WFB mechanism, a linear programming approach is used in the computation of the packet selection probabilities, and prior knowledge of source traffic characteristics is required, attests to the current impracticality of the WFB approach.

The cell loss performance of individual connections does get addressed by D. Haymand et al in "Statistical Analysis and Simulation Study of Video Teleconference Traffic in ATM Networks," IEEE Trans. Circuits and Sys. For Video Technology, 2(1):49–59, March 1992, where the ATM multiplexer keeps track of accumulated cell losses for all active connections. When a new cell arrives and the buffer is full, a cell is discarded from the connection which has the lowest current accumulated loss rate (among all connections that have cells currently in the buffer). This approach requires on-line measurements of both the number of losses and arrivals, and it requires maintaining running ratios, which is computationally intensive, and does not allow for QoS requirements. A generalized version of the above, given in "A Measurement-Based Loss Scheduling Scheme," by T. Yang and J. Pan in Proc. INFOCOM'96, pages 1062–1071, 1996, deals with situations where traffic streams have different characteristics as well as different loss (QoS) requirements. When a cell arrives and the buffer is full, a cell is discarded only if it belongs to a connection with the smallest ratio between its loss ratio measurement and its loss performance requirement, a predetermined number. The limitations of the Yang et al scheme are that not only is the on-line measurement of cell loss ratio required, but it is not optimal if all connections are not equally demanding.

What is needed, then, is an effective and simple-to-implement technique that redistributes cell losses according to each connection's QoS.

SUMMARY

The disadvantages of prior art cell discarding techniques are overcome with a method that intelligently discards complete packets. When a cell that arrives at a node finds the node's buffer full, a connection is selected for discarding of cells. The selected connection is one which includes at least one cell that corresponds to the beginning of a packet. In another embodiment, the connection is chosen by first making an initial selection, determining whether that selection can stand, and if not, by making an alternate selection. When an alternate selection is made, a credit factor associated with the initial selection is decremented, while the credit factor of the alternate selection is incremented. The initial selection can be carried out by considering the overall traffic load at the node, the individual traffic loads that comprise the overall traffic load of the node, and the QoS that is desired for the various connections that are active in the node.

DETAILED DESCRIPTION

The basic problem, as indicated above, is how to handle in the most effective and simple-to-implement way the task of discarding cells at an ATM node, when necessary, while insuring a given Quality of Service for all of the virtual connections that are active in the node.

The following discloses a number of cell-discarding embodiments that are based on a fairness notion that is defined as a function of the traffic load at the node and the cell loss ratio ceilings of the different virtual connections that flow through the node. Thus, a Fair Ratio of Loss (FRL) is defined as $$L_u^{fair} = \frac{\lambda_u p_u}{\sum_{i=1}^{N} \lambda_i p_i},$$

where $\lambda_u$ is the declared (contracted) mean arrival rate of connection u, N is the total number of active connections, and $p_u$ is the CLR of connection u.

Moreover, the disclosed algorithm employs complete buffer sharing, which means that a given buffer B of the node is shared by all of the active connections. Although all buffered cells are placed in a single buffer B, it is still possible to view the buffer as a collection of logical, or virtual, subqueues.

Another notion that is employed herein is the notion of a credit factor, whereby when a cell arrives and a decision is reached to drop a queued cell of some first connection but that connection cannot drop a cell (or for some other reason it is inadvisable to do so), then a second connection drops a cell and is given credit for having suffered the loss of a cell when it should not have. Correspondingly, the first connection loses a credit. The level of the connection's credit factor is taken into account when a cell needs to be discarded and a decision needs to be made as to which connection is to suffer the loss of a cell.

Figure 1:
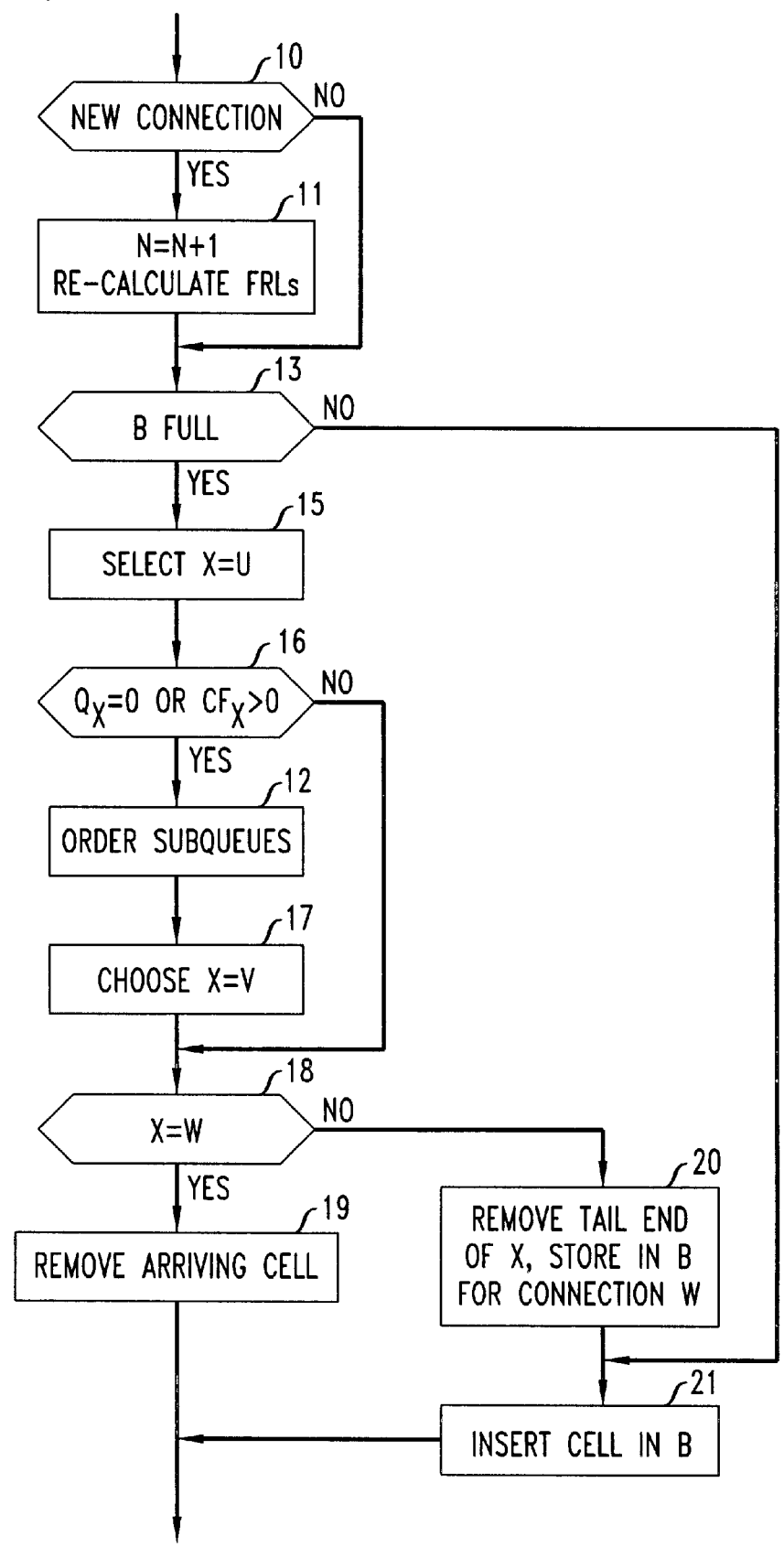
FIG. 1 is a flow diagram of a QoS oriented algorithm for discarding cells.

The flowchart of FIG. 1 discloses a QoS-oriented discarding algorithm in accordance with the principles disclosed herein. We call it the Fair Cell Discarding algorithm. When a cell arrives at the node, a determination is made in block 10 whether the cell belongs to a new connection. When such is the case, block 11 increments a count of the number of connections that are active in the node, N. It also calculates a new set of FRLs according to equation (1), and passes control to block 13. When the cell does not belong to a new connection, control passes to block 13 directly. Block 13 ascertains whether the arrived cell, belonging to a connection w, can be inserted into buffer B. When buffer B has room, the cell is stored in the buffer by block 21, and that ends the algorithm. When, on the other hand, buffer B is full, control passes to block 15, which selects one of the subqueues of buffer B for dropping a cell, i.e., sets a subqueue u to be the selected subqueue, x. The general approach for making the selection is based on a notion of fairness and, illustratively, it is based on the FRLs. The precise methodology for such a selection is not critical, and two methodologies are disclosed below.

From block 15 control passes to block 16 where the selected subqueue is evaluated. Obviously, one cannot drop a cell from an empty subqueue and, therefore, when $Q_x=0$ the selection of connection u cannot stand, and another subqueue must be selected. In accordance with the principles disclosed herein, however, the fact that the initially selected subqueue cannot bear its burden of having one of its cells be dropped and that another cell is carrying that burden is not left without an accounting. As indicated above, therefore, the notion of a Credit Factor (CF) is introduced, where the CF of the subqueue that is undertaking the cell dropping burden out of turn, so to speak, is incremented. Correspondingly, the credit factor of the initially selected subqueue is decremented. In evaluating the selection of block 15, therefore, the CF of the selected subqueue is also considered.

Thus, block 16 tests whether the subqueue selected in block 15 is empty or has a CF greater than 0. When that is the case, control passes to block 12 which sorts the subqueues by their CF values and passes control to block 17 which selects another subqueue, v, with the lowest CF value that is viable as the selected subqueue, x. Having selected a substitute subqueue, the CF of the selected subqueue x, i.e., subqueue v, is incremented, and the CF of subqueue u is decremented. Control then passes to block 18 which determines whether the finally selected subqueue, x, belongs to the subqueue w, which is the subqueue to which the arriving cell belongs. When such is the case, control passes to block 19 which simply discards the arriving cell. When such is not the case, control passes to block 20 which removes the cell of subqueue x that was entered last into buffer B, thus making room for the arriving cell. Control then passes to block 21.

Figure 2:
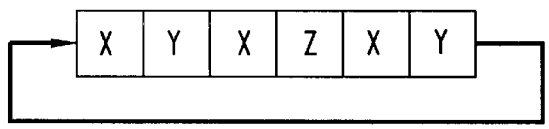
FIG. 2 shows a deterministic approach for selecting a subqueue.

Returning briefly to the action of block 15, the initial selection of a subqueue for a cell discarding can be deterministic, or probabilistic. FIG. 2 illustrates one implementation of a deterministic approach, showing an arrangement that is akin to a circulating shift register. The actual implementation can, of course, take on other forms, such as a table with an appropriately computed address pointer. The number of stages in such a shift register, or the number of entries in such a table, need not be larger than the Least Common Multiplier of the 1/FRLs and in some cases it can be smaller. In no event, however, would it be smaller than the inverse of the minimum FRL. In the FIG. 2 example, the set of FRLs is illustratively {12/24, 8/24, 4/24}, corresponding to connections X, Y, and Z, respectively. A table of 24 entries can be employed, but the smallest FRL is 1/6, and all of the other FRLs can be expressed in terms of 1/6$^{th}$. Therefore, a shift register of 6 stages, or a table with 6 entries, suffices. Hence, FIG. 2 shows six stages, with each of the stages assigned to one of the three connections in an arbitrary fashion, insisting only that the number of stages (or table entries) that are assigned to a particular connection corresponds to the number of ⅙$^{th}$ that are associated with that connection's FRL; that is, three stages assigned to connection X, two stages assigned to connection Y, and one stage assigned to connection Z.

A probabilistic implementation simply replaces the shift register, or table, with a random number generator that is arranged to output X, Y, or Z assignments with a probability of ½, ⅓, and ⅙, respectively. Some simulation results with a weighted round robin scheduling algorithm suggest that a deterministic approach is somewhat better.

Returning briefly to the action of block 17 of FIG. 1, in selecting a substitute subqueue, v, it is obvious that a subqueue should not be selected if it is empty. It is less obvious, but it also makes sense to not select a subqueue that already has credit. Although the sum of all credit factors is zero (by construction), generally there will be some connections with a negative CF, and some connections with a positive CF. It is possible, however, for one subqueue to be consistently empty when it is called to drop a cell and, hence, it is possible for all other subqueues to have a positive credit factor, and for the one connection that has a negative CF to be empty. Accordingly, in selecting a substitute subqueue, the action of block 17 can include an ordering of all non-empty subqueues by the credit factor, and selecting the subqueue with the lowest credit factor.

The above-disclosed algorithm is a cell-level selective discarding algorithm. In some applications, however, one may favor selective discarding at the packet level, because packets with missing cells will be discarded at the receiving end, anyway.

There are two prior art packet-level discarding approaches which are known as Partial Packet Discarding and Early Packet Discarding. With Partial Packet Discarding, if one cell of a packet is discarded, so are the following cells of that packet. With Early Packet Discarding, the cells of entire incoming packets are discarded once the buffer reaches a predetermined threshold prior to overflow.

The limitation of Partial Packet Discarding is that some cells which are already stored in the buffer when buffer fullness occurs will be transmitted but discarded by the receiver, thereby needlessly consuming bandwidth resources. The limitation of Early Packet Discarding lies in the tension inherent in the selection of the threshold. A low threshold might insure that the receiver will not have to discard cells, but it certainly increases the likelihood of a needless discarding of packets. Both the Partial Packet Discarding and the Early Packet Discarding algorithms operate only prospectively; that is, only on the incoming cells.

In light of the above-disclosed Fair Cell Discarding algorithm, the prior art disadvantages of Partial Packet Discarding and Early Packet Discarding are overcome by responding to the posed question "Why not discard from the beginning of a packet that is waiting in the buffer, instead of only one cell from the tail of the subqueue within the buffer?"

The following, indeed, discloses two packet discarding embodiments that are based on the principles disclosed herein, which we call the Complete Packet Discarding algorithm, and the Fair Packet Discarding algorithm.

For the Complete Packet Discarding algorithm, a counter is provided for each active connection in the node. The counter counts the number of cells which are stored in the buffer for a particular connection, i.e., in a particular subqueue, and which belong to an incomplete packet. For example, if some subqueue contains 7 cells, including a complete packet comprising 5 cells, then the cell-in-frame counter (CFC) for that connection, or subqueue, would carry the value 2.

Figure 3:
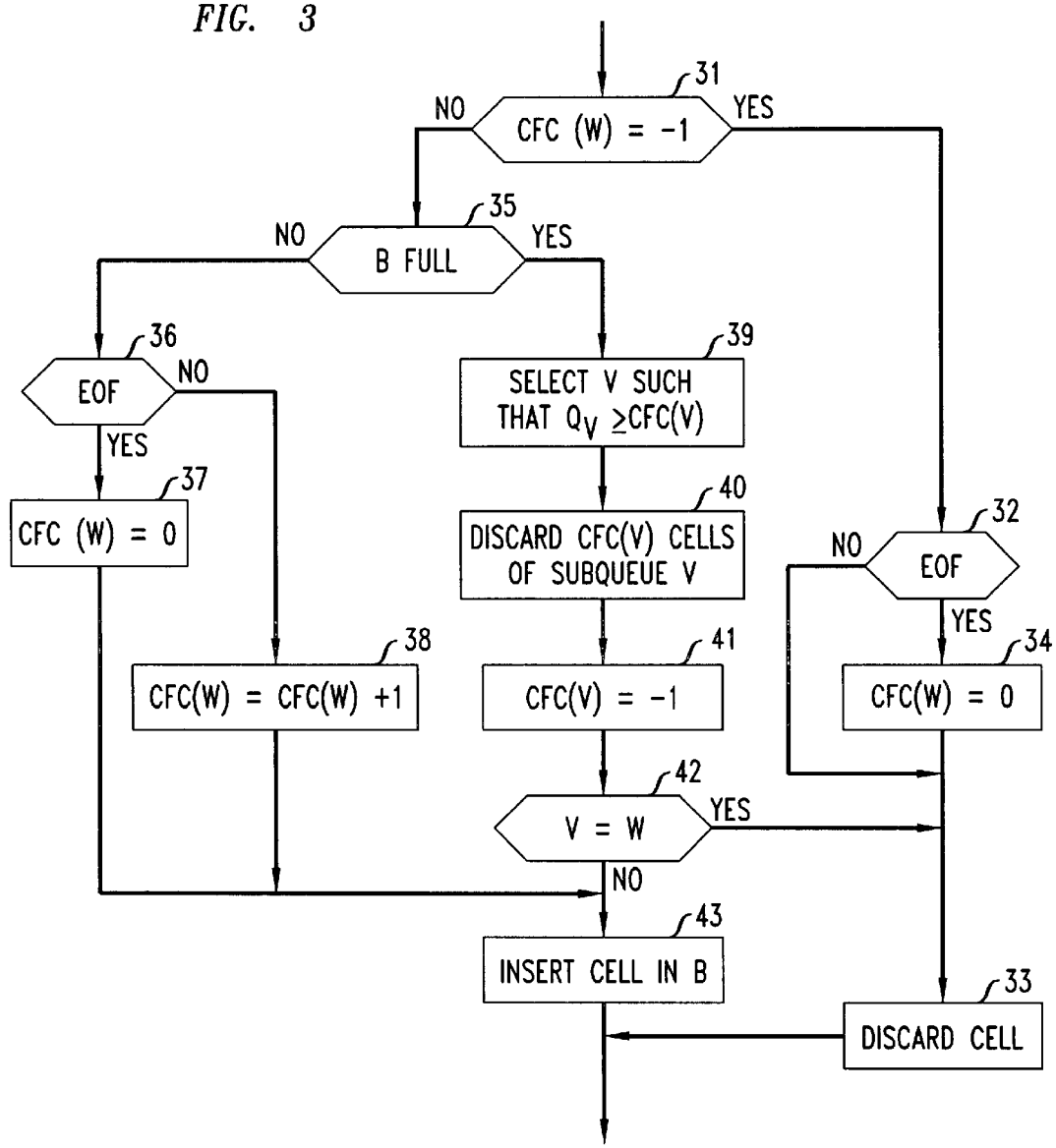
FIG. 3 illustrates a Complete Packet Discarding algorithm.

FIG. 3 illustrates a flow diagram of a Complete Packet Discarding algorithm in accord with the principles disclosed herein. When a cell arrives into the ATM multiplexer for connection u, i.e., its virtual connection ID is u, block 31 ascertains whether CFC(w) is equal to −1. Such a value indicates that a decision has been previously made to discard the packet to which the arriving cell belongs. Before discarding of the cell takes place, however, the cell is perused to determine whether an EOF field within it is set, which is indicative of the end of a packet. When, according to block 32, the cell being discarded does not have a set EOF field, control passes to block 33 where the cell is discarded. Otherwise, control passes to block 34 where CFC(w) is set to 0, indicating that the end of a packet has been reached, and then control passes to block 33. This terminates the automatic discarding of incoming connection u cells.

When CFC(w) is not −1, control passes to block 35 which ascertains whether the buffer is full. When the buffer is not full, control passes to block 36 which considers whether the cell has a set EOF field. When so, block 37 sets CFC(w) to zero and passes control to block 43 which inserts the arriving cell into the appropriate subqueue in the buffer. Otherwise, block 38 increments CFC(w) and passes control to block 43.

When the buffer is full, at least one cell is discarded by selecting a connection that is to suffer the lost cell. Once a connection is selected for discarding, in accordance with the principles of this disclosure all of the remaining cells that belong to the packet to which the discarded cell belongs are also discarded.

A number of embodiments can be realized for selecting the connection that is to suffer the discarded packet. In FIG. 3, the illustrated realization discards from the connection that has in its subqueue a cell that corresponds to the beginning of a packet, which is the case for subqueue v when the number of cells in the subqueue, $Q_v$ is greater than the number of stored cells in the current packets, CFC(v). Thus, when the buffer is fill, control passes in FIG. 3 from block 35 to block 39, which selects connection x in accordance with a predetermined algorithm, with the proviso that the selected connection, x, meet the requirement $Q_v \geq CFC(v)$. Control then passes to block 40.

Block 40 discards all cells belonging to the packet that is marked for discarding from the selected connection, v. It does so by going through the subqueue that maintains the cells of connection v, starting from the tail end of the subqueue, and deleting encountered cells that belong to connection x. With each deletion of a cell, CFC(v) is decremented. When CFC(v)=0, the deletion process terminates and passes control to block 41. Block 41 sets CFC(v) to −1 so that future cells of connection x that arrive at the node will be deleted by the action of blocks 32, 33, and 34. Control passes, thereafter, to block 42 which ascertains whether the selected subqueue, v, is the subqueue, w, to which the incoming cell belongs. When such is the case, control passes to block 33, where the incoming cell is discarded. Otherwise, control passes to block 43, where the cell is inserted into buffer B.

Figure 4:
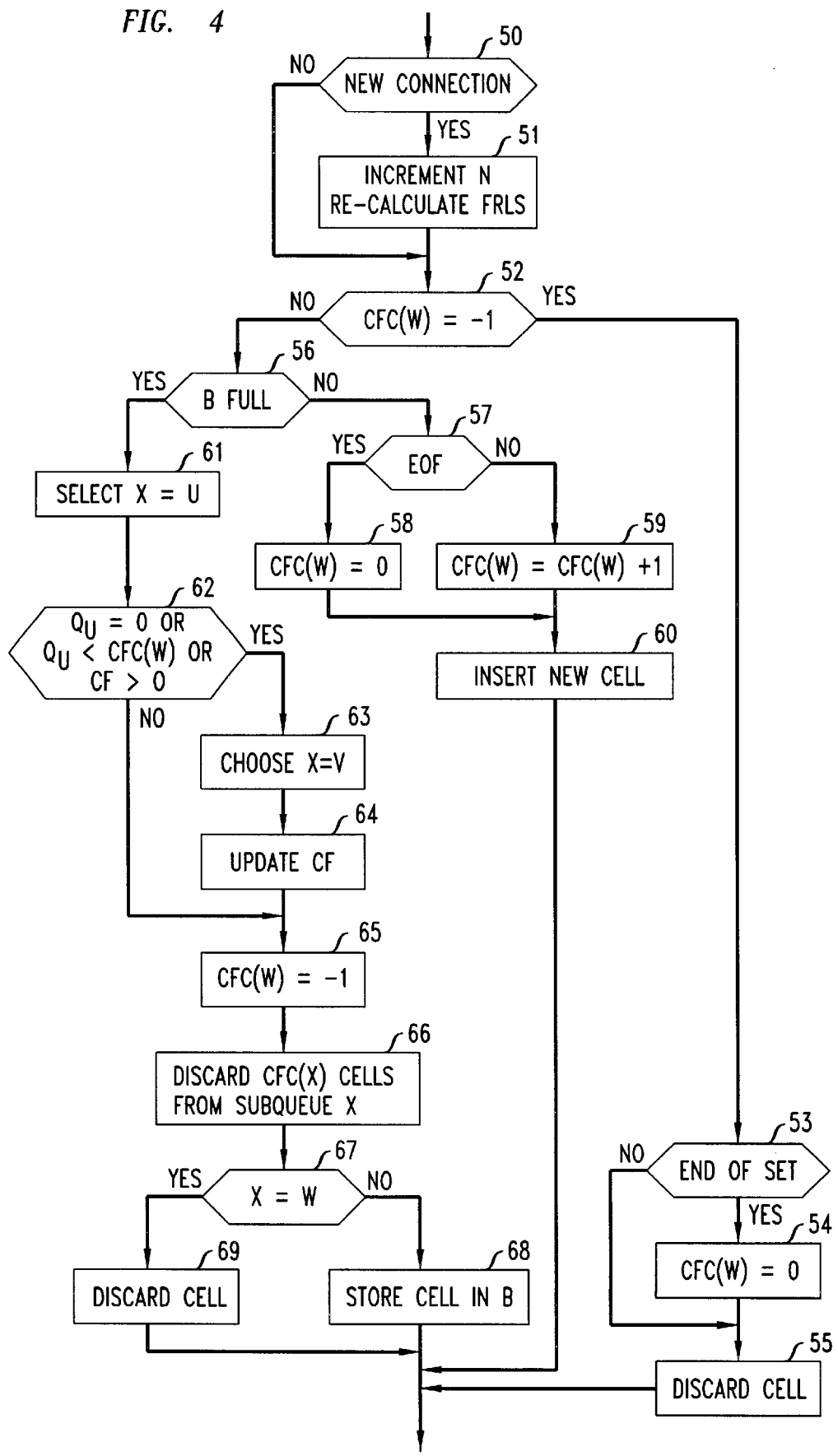
FIG. 4 illustrates a Fair Packet Discarding algorithm.

FIG. 4 presents an embodiment of an arrangement for deleting entire packets, where the selection of a connection v from which a packet is discarded is based on the Fair Cell Discarding algorithm disclosed above. In the FIG. 4 embodiment, the credit factor is updated at the packet level. An alternative embodiment for discarding of packets, where the credit factor is updated at the cell level, is also possible, but it has a slightly larger implementation overhead.

Turning attention to FIG. 4, when a new cell arrives, block 50 ascertains whether it belongs to a new connection. When that is the case, block 51 increments N, recalculates the FRLs according to equation (1), and passes control to block 52. Otherwise, control passes to block 52 directly. Block 52 ascertains whether the cell-in-frame counter of the connection to which the incoming cell belongs, CFC(w), is set at −1. A value of −1 indicates that the cell belongs to a packet that is being discarded and, therefore, the arriving cell needs to be discarded. Before the cell is discarded, however, block 53 determines whether the EOF field of the cell is set. When it is, indicating that the end of the packet has arrived, block 54 sets CFC(w) to zero and passes control to block 55, which discards the cell. When EOF is not set, control passes to block 55 directly.

When block 52 determines that CFC(w) is not set at −1, control passes to block 56, which determines whether the buffer is full. When the buffer is not full, control passes to block 57, which ascertains whether the EOF field of the cell is set. When it is, indicating that the end of a packet has arrived, block 58 sets CFC(w) to zero and passes control to block 60. Otherwise, block 59 increments the value of CFC(w) and passes control to block 60. Block 60 inserts the newly arrived cell into the w subqueue of the buffer. When block 56 determines that the buffer is full, control passes to block 61, which picks a connection, or subqueue, u, as the selected connection, or subqueue, x. The selection is made in accordance with a fairness notion, and can be made, for example, in the same manner as disclosed above for the Fair Cell Discarding algorithm of FIG. 1. After the selected subqueue is picked, control passes to block 62 which determines whether the selection should stand. The test illustrated in FIG. 4 considers the size of the selected subqueue and its credit factor. Regarding size, it is clearly not possible to discard cells from the selected subqueue that is empty. It also defeats the purpose to select that subqueue where the packet that would be discarded already has a number of cells that have been transmitted out of the buffer, i.e., $Q_x < CFC(x)$. Lastly, it is preferable to not pick a subqueue whose credit factor is large, because that indicates that the subqueue already discarded some packets "out of turn". Accordingly, block 62 tests for the above three conditions and, when the tests of block 62 are met, control passes to block 63 where a different subqueue is selected. More specifically, another subqueue, v, is picked as the selected subqueue, x, by sorting by the credit factors those subqueues that are not empty and include the beginning of a packet, and selecting the subqueue in the sorted list that has the smallest credit factor. Thereafter, control passes to block 64 where the credit factors are updated in the manner described before.

Following block 64, control passes to block 65, which is also the block reached when the tests of block 62 are not met. Block 65 sets CFC(x) to −1, indicating that the selected subqueue is set for discarding, and passes control to block 66. Block 66 discards all cells belonging to the packet that is marked for discarding from the selected connection, x, in the same manner as described above with reference to block 40 of FIG. 3, and passes control to block 67. Block 67 determines whether the selected subqueue is actually the subqueue to which the arriving cell belongs. When such is the case, control passes to block 69, which discards the arriving cell. When such is not the case, control passes to block 68, which puts the arriving cell into the proper subqueue within the buffer.

The above disclosed embodiments are illustrative of the principles of this invention. It should be realized, however, that variations on those embodiments, and enhancements thereto can be made by skilled artisans without departing from the spirit and scope of this invention, as it is defined in the accompanying claims.

We claim:

1. A method for controlling cell discarding in a node, comprising the steps of:

ascertaining, when a cell for a connection having a first connection ID has arrived at said node, whether a buffer of said node is full, when the step of ascertaining determines that said buffer is full, identifying a selected connection ID for cell discarding that corresponds to a subqueue in said buffer which contains a beginning cell of a packet;

discarding all cells of a last packet in a subqueue corresponding to a connection having the selected connection ID (discarded packet);

setting a marker to discard all cells incoming to said node which belong to said discarded packet;

storing said cell in a subqueue of said buffer that corresponds to a connection having said first connection ID, when said buffer is not fill, or when said buffer becomes no longer full by operation of said step of discarding and said selected connection ID is other than said first connection ID; and incrementing a counter associated with said first connection ID when said step of storing is executed.

2. The method of claim 1 where said incrementing is modulo M, where M is a number of cells in a packet.

3. The method of claim 1 where said step of identifying said selected connection ID comprises a deterministic selection.

4. The method of claim 1 where said step of identifying said selected connection ID comprises a step of making an initial selection of a connection ID, a step of ascertaining whether said initial selection can stand, and a step of identifying said selected connection ID as the connection ID of said initial selection when said step of ascertaining indicates that said initial selection can stand, or as the connection ID of an alternate connection when said step ascertaining indicates that said initial selection cannot stand.

5. The method of claim 4 where said initial selection is based on overall incoming traffic of all active connections in said node and on QoS requirements of said connections.

6. The method of claim 5 where said initial selection is made deterministically, taking account of said overall incoming traffic of all active connections in said node and said QoS requirements of said connections.

7. The method of claim 5 where said initial selection is made probabilistically, taking account of said overall incoming traffic of all active connections in said node and said QoS requirements of said connections.

8. The method of claim 4 where the step of ascertaining determines that an alternate selection should be made for the selected connection ID when said initial selection of a connection ID corresponds to a subqueue in said buffer that is empty.

9. The method of claim 4 where the step of ascertaining determines that an alternate selection should be made for the selected connection ID when said initial selection of a connection ID corresponds to a subqueue in said buffer that is empty, or corresponds to a subqueue in said buffer that does not include a cell that forms the beginning of a packet.

10. The method of claim 4 where the step of ascertaining determines that an alternate selection should be made for the selected connection ID when said initial selection of a connection ID corresponds to a subqueue in said buffer that is empty, or corresponds to a subqueue in said buffer that does not include a cell that forms the beginning of a packet, or corresponds to a subqueue that is associated with a credit factor that is positive.

11. The method of claim 4 where the step of ascertaining determines that an alternate selection should be made for the selected connection ID when said initial selection of a connection ID corresponds to a subqueue in said buffer that is empty, or corresponds to a subqueue in said buffer that does not include a beginning of a packet, or corresponds to a subqueue that is associated with a credit factor that does not exceed the minimum credit factor from the set of credit factors that correspond to all subqueues in said buffer that include a cell that forms the beginning of a packet.

12. In a node, tat includes a buffer for storing incoming packet cells, for later outputting of said packet cells, where each packet, containing M cells, is associated wit a connection ID, where each cell includes a connection ID identifier, and where said buffer provides for the storage of a subqueue of packet cells for each connection ID, a method for controlling said buffer, comprising the steps of:

receiving a cell;

identifying a connection ID of said cell, said connection ID also being a connection ID of a packet to which said cell belongs;

ascertaining whether said buffer is full;

when said buffer is not full, storing said cell at a tail end of that subqueue of cells in said buffer that corresponds to the connection ID of said cell;

when said buffer is full,
(a) making a selection to identify a selected connection ID, where said selected connection ID is chosen from a set of connection IDs whose corresponding subqueues in said buffer contain an incomplete packet
(b) deleting said incomplete packet in said subqueue that corresponds to said selected connection ID
(c) when said selected connection ID is the same as the connection ID of the cell received at said step of receiving a cell, deleting said cell received at said step or receiving; and
(d) when said selected connection ID is not the same as the connection ID of the cell received at said step of receiving a cell, storing said cell received at said step of receiving in said buffer.

13. The method of claim 12 wherein said storing of said cell in substep (d) is at the tail end of that subqueue of cells in said buffer that corresponds to the connection ID of said cell.

14. The method of claim 12 wherein said step of making a selection to identify a selected connection ID selects a connection from a set of connections that have queues with at least one complete packet.

15. The method of claim 12 wherein said step of making a selection to identify a selected connection ID selects a connection from a set of connections that have a cell-in-frame counter CFC value that is greater than the number of cells in the respective queue.

16. The method of claim 12 wherein said step of making a selection to identify a selected connection ID comprises:

making an initial selection of a connection ID, when said initial selection meets predetermined criteria, assigning said initial selection as said selected connection ID, and when said initial selection fails to meet said predetermined criteria, assigning an alternate connection ID as said selected connection ID.

17. The method of claim 16 wherein said criteria are met when said initial selection of a connection ID identifies a connection ID with a non-empty queue and a credit factor that is not greater than zero.

18. The method of claim 16 wherein said criteria are met when said initial selection of a connection ID identifies a connection ID with at least one complete packet in its queue and a credit factor that is not greater than zero.

* * * * *